United States Patent Office 3,709,910
Patented Jan. 9, 1973

3,709,910
CYCLOPROPANECARBOXYLIC ACID ESTERS
Masano Matsui, Tokyo, Takeaki Kato, Nishinomiya-shi, Kenzo Ueda, Saitama-ken, Toshio Mizutani, Ikeda-shi, Shigeyoshi Kitamura, Minoo-shi, Keimei Fujimoto, Kyoto, and Yositosi Okuno, Nishinomiya-shi, Japan, assignors to Sumitomo Chemical Company, Ltd., Osaka, Japan
No Drawing. Filed Aug. 21, 1967, Ser. No. 661,841
Claims priority, application Japan, Aug. 24, 1966, 41/55,973; Aug. 25, 1966, 41/56,158
Int. Cl. C07d 27/56
U.S. Cl. 260—326 A                              17 Claims

ABSTRACT OF THE DISCLOSURE

New cyclopropanecarboxylic acid esters having insecticidal properties are obtained by reacting a substituted cyclopropanecarboxylic acid or a halide or anhydride thereof with an N-methylolated compound.

Further, the cyclopropanecarboxylates are obtained by reacting an alkali metal salt, ammonium salt or organic tertiary amine salt of a substituted cyclopropanecarboxylic acid with an N-halogenomethylimide compound.

The new cyclopropanecarboxylic acid esters have excellent insecticidal properties which are superior to chrysanthemumic acid esters, which have heretofore been used as insecticides, and are usable as strong, multi-purpose insecticides in admixture with common diluents for insecticides and with other insecticides.

This invention relates to novel cyclopropanecarboxylic acid esters, to a process for producing the same and to insecticidal compositions containing the same. More particularly, the invention pertains to novel cyclopropanecarboxylic acid esters represented by the formula,

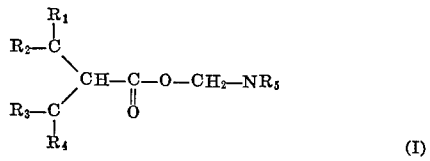

(I)

wherein $R_1$ is a hydrogen atom, lower alkyl group or phenyl group, said phenyl group may have been substituted by a lower alkyl group or alkoxy group; $R_2$, $R_3$ and $R_4$ are individually a lower alkyl group; $R_5$ is a group necessary to form a nitrogen atom-containing heterocyclic ring; to a process for preparing the same and; to insecticidal compositions containing the same.

Esters of chrysanthemic acid and pyrethric acid (hereinafter generically termed as "chrysanthemumic acids") with cyclopentenolones are named as so-called pyrethroides and have widely been used as epidemic prevention chemicals due to their low toxicity to warm-blooded animals and rapid acting properties. Further, it has been found that when formed into esters with a chrysanthemumic acid, some alcohols other than cyclopentanolones give low toxic, quick acting compounds, as well.

Most of the low toxic, quick acting chemicals known heretofore contain chrysanthemumic acid esters as effective ingredients. Particularly, isobutenyl groups in the structure of chrysanthemumic acid have been considered essential as a condition for the chemicals to display the above-mentioned properties. During the studies on chrysanthemumic acid esters, however, the present inventors have found that for the attainment of said low toxicity and quick acting property, isobutenyl groups in the structure of chrysanthemumic acid are not always necessary, but esters of substituted cyclopropanecarboxylic acids represented by the formula,

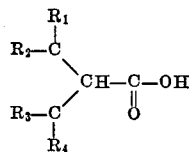

(II)

wherein $R_1$, $R_2$, $R_3$ and $R_4$ have the same significances as mentioned before, are also effective. More surprisingly, the inventors have discovered that when the same alcohols are used, esters of said substituted cyclopropanecarboxylic acids are produced having excellent insecticidal properties which in most cases are superior to esters of chrysanthemumic acid.

Thus, according to the invention, the present compounds are novel and also display insecticidal properties generally superior to the chrysanthemumic acid esters.

The present compounds have prominent insecticidal effects on the so-called insanitary insects such as flies, mosquitoes and cockroaches and, nevertheless, are harmless to warm-blooded animals.

By virtue of such characteristics, the present compounds not only find wide uses, particularly for epidemic prevention, but are extremely useful for the prevention and extermination of insects noxious to stored cereals and of those injurious to agriculture and forestry.

Particularly, due to their low toxicity and harmlessness to men and beasts, the present compounds are markedly superior in that they are applicable also to crops before harvest, home horticulture, glass culture and food-packaging materials.

The new cyclopropanecarboxylic acid esters in accordance with the present invention can be prepared with ease and at low costs by esterifying a carboxylic acid, represented by the formula,

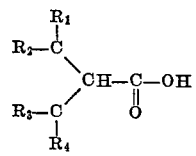

(II)

wherein $R_1$, $R_2$, $R_3$ and $R_4$ have the same significances as mentioned above, with a methylol compound represented by the formula,

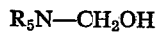

$$R_5N—CH_2OH \quad (III)$$

wherein $R_5$ has the same significance as mentioned above according to the general esterifying procedure. $R_1$, $R_2$, $R_3$, $R_4$ and $R_5$ will be explained in detail below. Typical as $R_1$ are hydrogen, methyl, ethyl, n-propyl, i-propyl, phenyl, p-tolyl and p-anisyl groups. Typical as $R_2$, $R_3$ and $R_4$ are methyl, ethyl, n-propyl and i-propyl groups, which may be the same or different. Exemplary of the groups represented by —$NR_5$ may be mentioned:

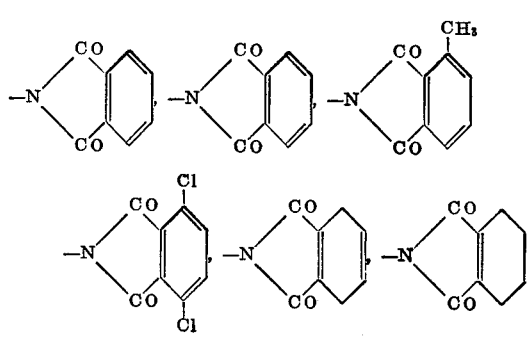

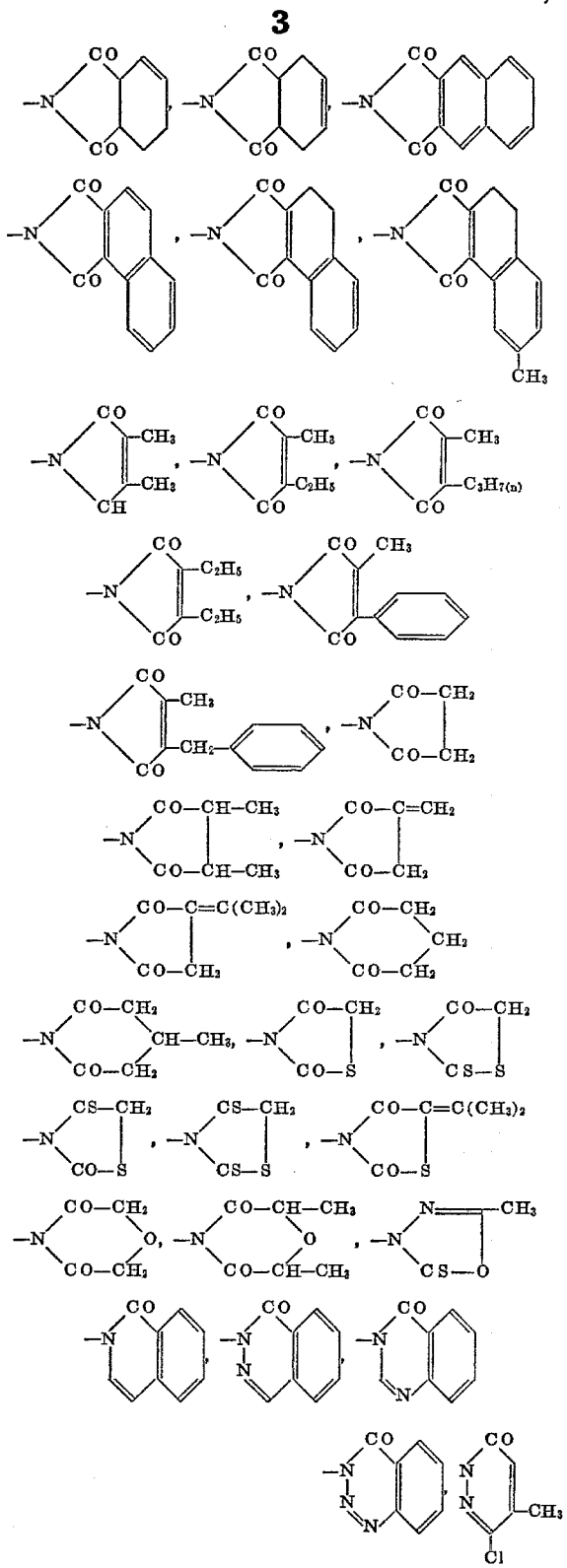

The esterification reaction of the present invention may be effected in various ways.

An N-methylol compound represented by the formula, $$R_5N-CH_2OH \qquad (III)$$

wherein $R_5$ has the same significance as mentioned before, may be reacted in the presence of a de-hydrogen halide agent with a cyclopropanecarboxylic acid halide represented by the formula,

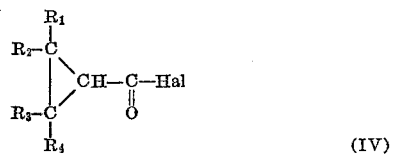

(IV)

wherein $R_1$, $R_2$, $R_3$ and $R_4$ have the same significances as mentioned above; and Hal is a hologen atom. As the de-hydrogen halide agents, organic tertiary base such as pyridine, triethylamine and dimethylaniline are most preferably employed, and after the reaction, these are easily recovered, regenerated, and reused. The methylol compound represented by the general Formula III is readily obtainable by reacting a corresponding imide ($R_5NH$) with formaldehyde or a formaldehyde-yielding compound in water or in an inert organic solvent at room temperature or at an elevated temperature. Further, the acid halide represented by the general Formula IV may also be easily prepared by reacting a corresponding acid represented by the general Formula II with a halogenating agent such as a thionyl halide, phosgene or phosphorus trihalide. The cyclopropanecarboxylic acid esters are prepared by dissolving a methylol compound represented by the Formula III and a deacidifying agent in an inert solvent such as benzene, toluene or n-hexane and adding to the solution an acid halide represented by the general Formula IV either in a batch-wise manner or continuous manner. The methylol compound, acid halide and deacidifying agent may be used in stoichiometrical amounts. However, in order to obtain the desired product in high yields and to terminate the reaction in a short period of time, the deacidifying agent is preferably used in 50% excess of the theoretical amount. The reaction temperature is desirably room temperature or below, and even when the reaction is effected at an elevated temperature, no particular advantage is attained. The use of a solvent is not indispensable but is preferable for smooth progress of the reaction.

Alternatively a methylol compound represented by the aforesaid general Formula III may be reacted with a cyclopropanecarboxylic anhydride represented by the general formula

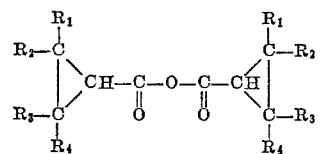

wherein $R_1$, $R_2$, $R_3$ and $R_4$ have the same significances as mentioned before. In this case, the reaction proceeds at room temperature, but in order to complete the reaction in a short period of time, it is preferable to carry out the reaction with reflux in an inert solvent such as xylene or toluene. The acid anhydride employed in the above process is easily obtained by heating and refluxing a corresponding acid of the general Formula II with acetyl chloride, and the acid recovered in the esterification is again formed into an acid anhydride and is repeatedly used.

Further, in the presence of a dehydrating agent such as dicyclohexyl-carbodiimide a methylol compound represented by the aforesaid Formula III may be reacted with a cyclopropanecarboxylic acid represented by the formula,

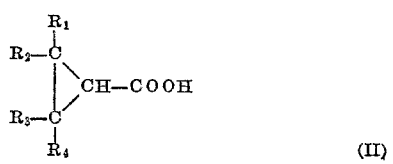

(II)

wherein $R_1$, $R_2$, $R_3$ and $R_4$ have the same significances as mentioned before. In this case, the reaction smoothly proceeds at room temperature in an inert solvent, such as benzene, toluene or methylene chloride, to give the desired product in high yields.

Still further, an N-halogenomethyl imide represented by the general formula $$R_5N\text{—}CH_2\text{—}Hal \qquad (VI)$$

wherein $R_5$ and Hal have the same significances as mentioned before, may be reacted with an alkali metal salt, ammonium salt or organic tertiary amine salt of a cyclopropanecarboxylic acid represented by the Formula II at room temperature or at an elevated temperature in an inert solvent such as acetone, benzene or toluene. In place of using an organic tertiary amine salt of said cyclopropanecarboxylic acid, the cyclopropanecarboxylic acid and an organic tertiary amine may be added to the reaction system either simultaneously or separately. As the organic amines to be used in the above process, pyridine, dimethylaniline and triethylamine are preferable. The N-halogenomethyl imides represented by the Formula VI are prepared in high yields by halogenating corresponding N-methylol compound with a thionyl halide, phosphorus trihalide or phosgene.

The cyclopropanecarboxylic acid esters represented by the Formula I, which are prepared according to the present invention having such characteristics as detailed above, are novel compounds. As the result of tests, the present inventors have found that said esters are far more excellent in insecticidal effects than known compounds similar in structure thereto, though they are simpler in structure. In the case of esters of this kind, it has heretofore been considered as an essential condition for the display of excellent biological activity that the structure of the acid side has unsaturated aliphatic side chains as seen in chrysanthemum monocarboxylic acids or pyrethric acids. The desired products of the present invention are epoch-making compounds which have destroyed the established theory mentioned above, and it should be said to be quite surprising that the compounds, which have such simple structures coupled with the alcohol-side components, show insecticidal effects far greater than the conventional complex compounds. Further, some of the present compounds are entirely free from stereoisomers, on the whole. This also is worthy of particular mention as a counter-evidence to the fact that the biological activities of the conventional analogous compounds, all of which are stereoisomers, have been considered ascribable to their stereospecificity (having optical and geometrical isomerism). It has thus been found that the present compounds can be prepared at low costs in accordance with the present process, are applicable without any fear not only to insanitary insects and to insects noxious to horticulture but also to insects injurious to agriculture, in general, and can give quick acting and accurate results.

Typical examples of the cyclopropanecarboxylic acids represented by the Formula II, which are used in the present invention either as such or in the form of reactive derivatives thereof (halides, anhydrides or salts), are as follows:

2,2,3-trimethylcyclopropanecarboxylic acid
2,2,3,3-tetramethylcyclopropanecarboxylic acid
2,2-dimethyl-3,3-diethylcyclopropanecarboxylic acid
2,2,3,3-tetraethylcyclopropanecarboxylic acid
2,2,3-trimethyl-3-ethylcyclopropane carboxylic acid
2,2,3-trimethyl-3-phenylcyclopropanecarboxylic acid
2,2-dimethyl-3-ethyl-3-phenylcyclopropanecarboxylic acid
2,2,3-trimethyl-3-(p-tolyl)-cyclopropanecarboxylic acid
2,2,3-trimethyl-3-(p-anisyl)-cyclopropanecarboxylic acid The desired products of the present invention can be obtained, using arbitrary combinations within the scope of the characteristics of the present invention, from the above-mentioned cyclopropanecarboxylic acids or reactive derivatives thereof and the aforesaid N-methylolimides or N-halogenated methylimides. Typical examples obtained in accordance with the present invention are as shown below, but it is needless to say that the scope of the present invention is not limited to these esters.

| Compound No. | Structural formula |
|---|---|
| (1) | Phthalimidomethyl 2,2,3-trimethylcyclopropane-carboxylate. |
| (2) | Thiophthalimidomethyl 2,2,3-trimethylcyclopropane-carboxylate. |
| (3) | 3,6-dihydrophthalimidomethyl 2,2,3-trimethylcyclopropanecarboxylate. |
| (4) | 1,2,3,6-tetrahydrophthalimidomethyl 2,2,3-trimethylcyclopropanecarboxylate. |
| (5) | 3,4,5,6-tetrahydrophthalimidomethyl 2,2,3-trimethylcyclopropanecarboxylate. |
| (6) | Dimethylmaleimidomethyl 2,2,3-trimethylcyclopropanecarboxylate. |
| (7) | Isopropylidene-succinimidomethyl 2,2,3-trimethylcyclopropanecarboxylate. |

| Compound No. | Structural formula |
|---|---|
| (8) | Phthalimidomethyl 2,2,3,3-tetramethylcyclopropanecarboxylate. |
| (9) | Thiophthalimidomethyl 2,2,3,3-tetramethylcyclopropanecarboxylate. |
| (10) | 3,6-dichlorophthalimidomethyl 2,2,3,3-tetramethylcyclopropanecarboxylate. |
| (11) | 3,6-dihydrophthalimidomethyl 2,2,3,3-tetramethylcyclopropanecarboxylate. |
| (12) | 3,4,5,6-tetrahydrophthalimidomethyl 2,2,3,3-tetramethylcyclopropanecarboxylate. |
| (13) | 1,2,3,6-tetrahydrophthalimidomethyl 2,2,3,3-tetramethylcyclopropanecarboxylate. |
| (14) | 1,2,3,4-tetrahydrophthalimidomethyl 2,2,3,3-tetramethylcyclopropanecarboxylate. |
| (15) | 3,4-dihydronaphthalene-1,2-dicarboxyimidomethyl 2,2,3,3-tetramethylcyclopropanecarboxylate. |
| (16) | 3,4-dihydro-7-methylnaphthalene-1,2-dicarboxyimidomethyl 2,2,3,3-tetramethylcyclopropanecarboxylate. |
| (17) | Dimethylmaleimidomethyl 2,2,3,3-tetramethylcyclopropanecarboxylate. |
| (18) | Methylethylmaleimidomethyl 2,2,3,3-tetramethylcyclopropanecarboxylate. |
| (19) | Diethylmaleimidomethyl 2,2,3,3-tetramethylcyclopropanecarboxylate. |
| (20) | Methylphenylmaleimidomethyl 2,2,3,3-tetramethylcyclopropanecarboxylate. |
| (21) | Methylbenzylmaleimidomethyl 2,2,3,3-tetramethylcyclopropanecarboxylate. |
| (22) | 1,2-dimethylsuccinimidomethyl 2,2,3,3-tetramethylcyclopropanecarboxylate. |
| (23) | Isopropylidenesuccinimidomethyl 2,2,3,3-tetramethylcyclopropanecarboxylate. |

| Compound No. | Structural formula |
|---|---|
| (24) | Glutarimidomethyl 2,2,3,3-tetramethylcyclopropanecarboxylate. |
| (25) | 2-methylglutarimidomethyl 2,2,3,3-tetramethylcyclopropanecarboxylate. |
| (26) | 2-thioxo-4-oxo-1,3-thiazolidin-3-ylmethyl 2,2,3,3-tetramethylcyclopropanecarboxylate. |
| (27) | 2,4-dioxo-1,3-thiazolidin-3-ylmethyl 2,2,3,3-tetramethylcyclopropanecarboxylate. |
| (28) | 5-isopropylidene-2,4-dioxo-1,3-thiazolidin-3-ylmethyl 2,2,3,3-tetramethylcyclopropanecarboxylate. |
| (29) | 3,5-dioxo-1,4-perhydroxazin-4-ylmethyl 2,2,3,3-tetramethylcyclopropanecarboxylate. |
| (30) | 2,6-dimethyl-3,5-dioxo-1,4-perhydroxazin-4-ylmethyl 2,2,3,3-tetramethylenecyclopropanecarboxylate. |
| (31) | 1,2-dihyhro-1-oxoisoquinolin-2-ylmethyl 2,2,3,3-tetramethylcyclopropanecarboxylate. |
| (32) | 1,2-dihydro-1-oxophthalazin-2-ylmethyl 2,2,3,3-tetramethylcyclopropanecarboxylate. |
| (33) | 3,4-dihydro-4-oxoquinazolin-3-ylmethyl 2,2,3,3-tetramethylcyclopropanecarboxylate. |
| (34) | 5,6-benzo-3,4-dihydro-4-oxo-1,2,3-triazin-3-ylmethyl 2,2,3,3-tetramethylcyclopropanecarboxylate. |
| (35) | Phthalimidomethyl 2,2,3-trimethyl-3-ethylcyclopropanecarboxylate. |
| (36) | Thiophthalimidomethyl 2,2,3-trimethyl-3-ethyl cyclopropanecarboxylate. |
| (37) | 3,4,5,6-tetrahydrophthalimidomethyl 2,2,3-trimethyl-3-ethylcyclopropanecarboxylate. |
| (38) | 1,2,3,6-tetrahydrophthalimidomethyl 2,2,3-trimethyl-3-ethylcyclopropanecarboxylate. |
| (39) | Dimethylmaleimidomethyl 2,2,3-trimethyl-3-ethylcyclopropanecarboxylate. |

| Compound No. | Structural formula |
|---|---|
| (40) | 5-isopropylidene-2,4-dioxo-1,3-thiazolidin-3-ylmethyl 2,2,3-trimethyl-3-ethylcyclopropanecarboxylate. |
| (41) | Isopropylidenesuccinimidomethyl 2,2,3-trimethyl-3-ethylcyclopropanecarboxylate. |
| (42) | 3,5-dioxo-1,4-perhydroxazin-4-ylmethyl 2,2,3-trimethyl-3-ethyl-cyclopropanecarboxylate. |
| (43) | Phthalimidomethyl 2,2-dimethyl-3,3-diethylcyclopropanecarboxylate. |
| (44) | Thiophthalimidomethyl 2,2-dimethyl-3,3-diethylcyclopropanecarboxylate. |
| (45) | 3,6-dihydrophthalimidomethyl 2,2-dimethyl-3,3-diethylcyclopropanecarboxylate. |
| (46) | 3,4,5,6-tetrahydrophthalimidomethyl 2,2-dimethyl-3,3-diethylcyclopropanecarboxylate. |
| (47) | Naphthalene-1,2-dicarboxyimidomethyl 2,2-dimethyl-3,3-diethylcyclopropanecarboxylate. |
| (48) | Dimethylmaleimidomethyl 2,2-dimethyl-3,3-diethylcyclopropanecarboxylate. |
| (49) | Methyl-n-propylmaleimidomethyl 2,2-dimethyl-3,3-diethylcyclopropanecarboxylate. |
| (50) | Thiophthalimidomethyl 2,2,3,3-tetraethylcyclopropanecarboxylate. |
| (51) | 3,4,5,6-tetrahydrophthalimidomethyl 2,2,3,3-tetraethylcyclopropanecarboxylate. |
| (52) | Dimethylmaleimidomethyl 2,2,3,3-tetraethylcyclopropanecarboxylate. |
| (53) | Naphthalene-2,3-dicarboxyimidomethyl 2,2,3,3-tetraethylcyclopropanecarboxylate. |
| (54) | Naphthalene-1,2-dicarboxyimidomethyl 2,2,3,3-tetraethylcyclopropanecarboxylate. |
| (55) | 2,3-dihydro-2-thioxo-5-methyl-1,3,4-oxadiazol-3-ylmethyl 2,2,3,3-tetraethylcyclopropanecarboxylate. |

| Compound No. | Structural formula |
|---|---|
| (56) | Thiophthalimidomethyl 2,2,3-trimethyl-3-phenylcyclopropanecarboxylate. |
| (57) | 3-methylphthalimidomethyl 2,2,3-trimethyl-3-phenylcyclopropanecarboxylate. |
| (58) | 3,4,5,6-tetrahydrophthalimidomethyl 2,2,3-trimethyl-3-phenylcyclopropanecarboxylate. |
| (59) | Dimethylmaleimidomethyl 2,2,3-trimethyl-3-phenylcyclopropanecarboxylate. |
| (60) | Methylenesuccinimidomethyl 2,2,3-trimethyl-3-phenlcyclopropanecarboxylate. |
| (61) | 1,2-dihydro-1-oxo-4-chlorophthalazin-2-ylmethyl 2,2,3-trimethyl-3-phenylcyclopropanecarboxylate. |
| (62) | Thiophthalimidomethyl 2,2-dimethyl-3-ethyl-3-phenylcyclopropanecarboxylate. |
| (63) | 3,4,5,6-tetrahydrophthalimidomethyl 2,2-dimethyl-3-ethyl-3-henylc pyclopropanecarboxylate. |
| (64) | Dimethylmaleimidomethyl 2,2-dimethyl-3-ethyl-3-phenylcyclopropanecarboxylate. |
| (65) | Thiophthalimidomethyl 2,2,3-trimethyl-3-(p-tolyl)-cyclopropanecarboxylate. |
| (66) | 3,4,5,6-tetrahydrophthalimidomethyl 2,2,3-trimethyl-3-(p-tolyl)-cyclopropanecarboxylate. |
| (67) | 3,4,5,6-tetrahydrophthalimidomethyl 2,2,3-trimethyl-3-(p-anisyl)-cyclopropanecarboxylate. |
| (68) | Dimethylmaleimidomethyl 2,2,3-trimethyl-3-(p-anisyl)-cyclopropanecarboxylate. |
| (69) | 2,4-dithioxo-1,3-thiazolidin-3-ylmethyl 2,2,3,3-tetramethylcyclopropanecarboxylate. |
| (70) | Succinimidomethyl 2,2,3,3-tetramethylcyclopropanecarboxylate. |
| (71) | 1,6-dihydro-3-chloro-4-methyl-6-oxopyridazin-1-ylmethyl 2,2,3,3-tetramethylenecyclopropanecarboxylate. |

In preparing the present compositions, common diluents for insecticides are used and processes thoroughly known to those skilled in the art are adopted to form them into any of oil preparation, dust preparation, aerosols, wettable powder, granules and mosquito coil or other fumigant preparation, like in the case of the conventional pyrethroids. Further, they may be formed into death inducing dust or solid preparation incorporated with baits or other materials attractive for noxious insects. The present compositions display their insecticidal effects when used in entirely the same manner as in the case of pyrethroids.

Further, the present compounds may be used in admixture of 2 or more, and the insecticidal effects of the present insecticides can be enhanced when the compounds are used in combination with a synergist for pyrethroides, such as α-[2-(2-butoxyethoxy)-ethoxy]-4,5-methylenedioxy-2-propyltoluene (hereinafter referred to as "piperonyl butoxide") or 1,2-methylenedioxy-4-[2-(octylsulfinyl)-propyl]-benzene (hereinafter referred to as "sulfoxide"). Further, in forming these compounds into mosquito coil, the insecticidal effects thereof can be enhanced by addition of 3,4-methylenedioxybenzoic acid, 2,6-ditertiarybutyl-4-methylphenol, benzene-para-dicarboxylic acid, benzene-meta-dicarboxylic acid, para-tertiarybutyl benzoic acid, para-tertiarybutyl benzoic acid piperonyl ester, 1-methyl-2-carboxy-4-isopropylcyclohexanone-(2), 3-methoxy-4-hydroxybenzoic acid or 2-isopropyl-4-acetylvaleric acid. In addition, multi-purpose compositions can be obtained by incorporation of other active ingredients, e.g., pyrethroid-type insecticides; organic phosphorus-type insecticides such as O,O-dimethyl-O-(3-methyl-4-nitrophenyl)thiophosphate (hereinafter referred to as "Sumithion") which is registered trade mark, O,O-dimethyl-2,2-dichlorovinyl phosphate (hereinafter referred to as "DDVP"), O,O-diethyl-O-(2 - isopropyl-4-methyl-6-pyrimidyl) phosphorothioate (hereinafter referred to as "diazinon"), or O,O-dimethyl-O-(3-methyl-4-methylthio) phosphorothioate (hereinafter referred to as "Baytex"), organic chlorine-type insecticides such as 1,1,1-trichloro-2,2-bis(p-chlorophenyl)-ethane (hereinafter referred to as "DDT"), 1,2,3,4,5,6-hexachlorocyclohexane (hereinafter referred to as "BHC"), 1,1,1 - trichloro-2,2-bis(p-methoxyphenyl)-ethane (hereinafter referred to as "methoxychlor"), carbamate-type insecticides such as 1-naphthyl-N-methylcarbamate (hereinafter referred to as "Sevin"), or the like insecticides; sterilizers; acaricides; herbicides; rodenticides; fertilizers; and other agricultural chemicals.

The following examples illustrate the present invention. However it is not intended to limit the invention to the examples. Parts are by weight.

EXAMPLE 1

9.1 g. of (N-hydroxymethyl)-3,4,5,6-tetrahydrophthalimide and 6 g. of pyridine were dissolved in 30 ml. of dry toluene. To this solution was added with ice-cooling a solution of 8 g. of 2,2,3,3-tetramethylcyclopropanecarboxylic acid chloride in 20 ml. of dry toluene. The mixed solution was shielded from moisture and was stirred at room temperature for 5 hours. To the reaction liquid, 20 ml. of water was added to dissolve the deposited crystals of pyridine hydrochloride. After separating the liquid, the organic layer was washed successively with 5% hydrochloric acid, aqueous saturated sodium bicarbonate solution and saturated sodium chloride water. After drying the liquid with sodium sulfate, the toluene was removed by reduced pressure distillation, and the residual oily substance was once dissolved in n-hexane and was then crystallized to obtain 12 g. of white crystals of 2,3,4,5-tetrahydrophthalimidomethyl 2,2,3,3-tetramethylcyclopropanecarboxylate, M.P. 66°–68° C. (from n-hexane), having the following structural formula:

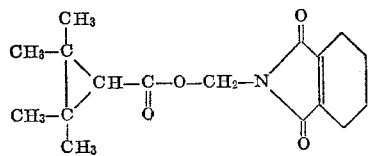

Elementary analysis for $C_{17}H_{23}NO_4$.—Found (percent): C, 66.90; H, 7.57; N, 4.60. Calculated (percent): C, 66.86; H, 7.59; N, 4.59.

EXAMPLE 2

9.7 g. of (N-hydroxymethyl)-thiophthalimide and 13.3 g. of 2,2,3,3-tetramethylcyclopropanecarboxylic acid were mixed in 30 ml. of toluene. After refluxing for 3 hours, the mixture was washed with a 3% aqueous sodium hydroxide solution at below 20° C. to remove by-produced 2,2,3,3 - tetramethylcyclopropanecarboxylic acid. Subsequently, the reaction liquid was washed with saturated sodium chloride water, was dried with sodium sulfate and was freed from the solvent by reduced pressure distillation. Thereafter, the residue was crystallized in the same manner as in Example 1 to obtain 14 g. of red crystals of thiophthalimidomethyl 2,2,3,3 - tetramethylcyclopropanecarboxylate, M.P. 100.5°–101.5° C. (from n-hexane), having the following structural formula:

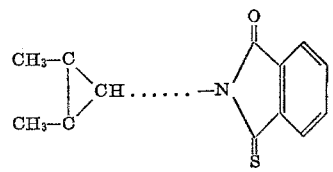

Elementary analysis for $C_{17}H_{19}NO_3S$.—Found (percent): C, 64.35; H, 6.01; N, 4.41; S, 10.08. Calculated (percent): C, 64.33; H, 6.03; N, 4.41; S, 10.10.

EXAMPLE 3

7.8 g. of (N-hydroxymethyl)-dimethylmaleimide and 7.1 g. of 2,2,3,3-tetramethylcyclopropanecarboxylic acid were dissolved in 40 ml. of methylene chloride. To this solution, 11 g. of dicyclohexylcarbodiimide was added, and the mixture was allowed to stand at room temperature for 24 hours. After separating the deposited dicyclohexyl urea by filtration, the reaction liquid was subjected to the same after-treatment as in Example 1 to obtain 10 g. of white crystals of dimethylmaleimidomethyl 2,2,3,3-tetramethylcyclopropanecarboxylate, M.P. 118°–121° C. (from n-hexane), having the following structural formula:

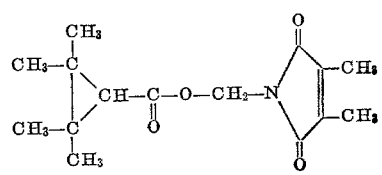

Elementary analysis for $C_{15}H_{21}NO_4$.—Found (percent): C, 64.48; H, 7.60; N, 4.87. Calculated (percent): C, 64.50; H, 7.58; N, 5.01.

EXAMPLE 4

9.4 g. of (N-chloromethyl)-isopropylidene-succinimide obtained by chlorinating (N-hydroxymethyl)-isopropylidene-succinimide with thionyl chloride was dissolved in 300 ml. of dry acetone together with 7.1 g. of 2,2,3,3-tetramethylcyclopropanecarboxylic acid. To this solution, 6 g. of triethylamine was added dropwise with stirring in 30 minutes, and then the mixture was refluxed for 5 hours. After completion of the reaction, the deposited triethylamine hydrochloride was separated by filtration, and acetone was removed from the filtrate by distillation. The residual oily substance was dissolved in toluene, and the solution was washed and after-treated in the same manner as in Example 1 to obtain 13 g. of white crystals of isopropylidene-succinimidomethyl 2,2,3,3-tetramethylcyclopropanecarboxylate, M.P. 135°–137° C. (from n-hexane), having the following structural formula:

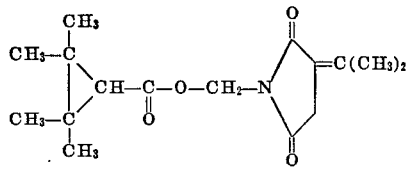

Elementary analysis for $C_{16}H_{23}NO_4$.—Found (percent): C, 65.60; H, 7.83; N, 4.75. Calculated (percent): C, 65.51; H, 7.90; N, 4.77.

EXAMPLE 5

8.9 g. of (N-hydroxymethyl)-phthalimide, 8 g. of 2,2,3,3-tetramethylcyclopropanecarboxylic acid chloride and 6 g. of pyridine were reacted and after-treated in the same manner as in Example 1 to obtain 12 g. of white crystals of phthalimidomethyl 2,2,3,3-tetramethylcyclopropanecarboxylate, M.P. 141.2°–142.5° C. (from n-hexane-toluene), having the following structural formula:

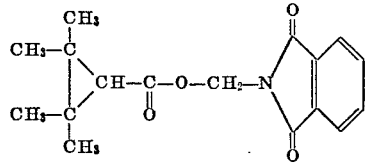

Elementary analysis for $C_{17}H_{19}NO_4$.—Found (percent): C, 67.81; H, 6.36; N, 4.64. Calculated (percent): C, 67.76; H, 6.36; N, 4.65.

EXAMPLE 6

9.1 g. of (N-hydroxymethyl)-1,2,3,6-tetrahydrophthalimide, 8 g. of 2,2,3,3-tetramethylcyclopropanecarboxylic acid chloride and 6 g. of pyridine were reacted and after-treated in the same manner as in Example 1 to obtain 13 g. of white crystals of 1,2,3,6-tetrahydrophthalimidomethyl 2,2,3,3-tetramethylcyclopropanecarboxylate, M.P. 111.0°–111.5° C. (from n-hexane-benzene), having the following structural formula:

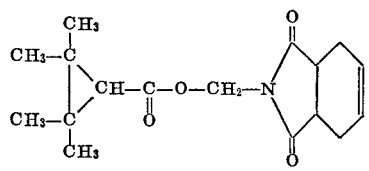

Elementary analysis for $C_{17}H_{23}NO_4$.—Found (percent): C, 66.88; H, 7.70; N, 4.59. Calculated (percent): C, 66.86; H, 7.59; N, 4.59.

EXAMPLE 7

12.2 g. of (N-hydroxymethyl)-3,4-dihydro-7-methylnaphthalene-1,2-dicarboxyimide and 13.3 g. of 2,2,3,3-tetramethylcyclopropanecarboxylic anhydride were reacted in the same manner as in Example 2 to obtain 16 g. of white crystals of 3,4-dihydro-7-methylnaphthalene-1,2 - dicarboxyimidomethyl 2,2,3,3 - tetramethylcyclopropanecarboxylate, M.P. 187°–189° C. (from n-hexane-toluene), having the following structural formula:

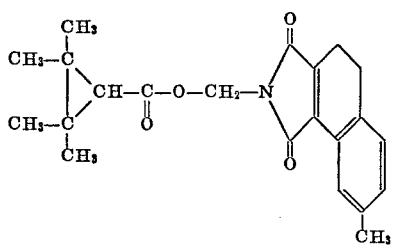

Elementary analysis for $C_{22}H_{25}NO_4$.—Found (percent): C, 72.00; H, 6.84; N, 3.84. Calculated (percent): C, 71.91; H, 6.86; N, 3.81.

EXAMPLE 8

9.4 g. of (N-hydroxymethyl)-5-isopropylidene-2,4-dioxo-1,3-thiazolidine, 8 g. of 2,2,3,3-tetramethylcyclopropanecarboxylic acid chloride and 6 g. of pyridine were reacted and after-treated in the same manner as in Example 1 to obtain 12 g. of 5-isopropylidene-2,4-dioxo-1,3-thiazolidine-3-ylmethyl 2,2,3,3 - tetramethylcyclopropanecarboxylate, M.P. 125°–125.5° C. (from n-hexane-benzene), having the following structural formula:

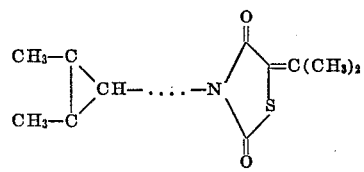

Elementary analysis for $C_{15}H_{21}NO_4S$.—Found (percent): C, 57.89; H, 6.83; N, 4.53; S, 10.22. Calculated (percent): C, 57.86; H, 6.80; N, 4.50; S, 10.30.

EXAMPLE 9

8.8 g. of N-(chloromethyl)-1,2-dimethylsuccinimide, 7.1 g. of 2,2,3,3-tetramethylcyclopropanecarboxylic acid and 6 g. of triethylamine were treated in the same manner as in Example 4 to obtain 11 g. of 1,2-dimethylsuccinimidomethyl 2,2,3,3 - tetramethylcyclopropanecarboxylate, M.P. 98°–100° C. (from n-hexane), having the following structural formula:

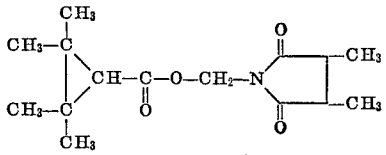

Elementary analysis for $C_{15}H_{23}NO_4$.—Found (percent): C, 64.05; H, 8.21; N, 5.01. Calculated (percent): C, 64.03; H, 8.24; N, 4.98.

EXAMPLE 10

0.4 part of the compound 1 was dissolved in 5 parts of xylene, and the solution was mixed with kerosene to make 100 parts, whereby an oil preparation was obtained.

EXAMPLE 11

0.2 part of the compound 2 was dissolved in 5 parts of xylene, and the solution was mixed with kerosene to make 100 parts, whereby an oil preparation was obtained.

EXAMPLE 12

0.2 part of the compound 3 and 1 part of piperonyl butoxide were dissolved in 3 parts of xylene, and the solution was mixed with kerosene to make 100 parts, whereby an oil preparation was obtained.

EXAMPLE 13

25 parts of the compound 5 was thoroughly mixed with 5 parts of Sorpol SM–200 (a kind of surface active agent, trade name of TOHO Chemical Co., Ltd., Japan: a mixture of polyoxyethylene alkyl phenyl ether and alkylaryl calcium sulfonate). The mixture was charged with 70 parts of 300 mesh talc and was thoroughly stirred in a mortar to obtain a wettable powder.

EXAMPLE 14

0.2 part of the compound 6 was dissolved in 5 parts of xylene, and the solution was mixed with kerosene to make 100 parts, whereby an oil formulation was obtained.

EXAMPLE 15

0.2 part of the compound 7 was dissolved in 5 parts of xylene, and the solution was mixed with kerosene to make 100 parts, whereby an oil preparation was obtained.

EXAMPLE 16

0.2 part of the compound 8 and 1 part of piperonyl butoxide were dissolved in 5 parts of xylene, and the solution was mixed with kerosene to make 100 parts, whereby an oil preparation was obtained.

EXAMPLE 17

0.2 part of the compound 9 and 1 part of sulfoxide were dissolved in 5 parts of xylene, and the solution was mixed with kerosene to make 100 parts, whereby an oil preparation was obtained.

EXAMPLE 18

10 parts of the compound 10, 10 parts of Sorpol SM-200 (same as mentioned before) and 80 parts of xylene were mixed and dissolved with stirring to obtain an emulsifiable concentrate.

EXAMPLE 19

0.5 part of the compound 11, 2 parts of methoxychlor, 5 parts of xylene and 7.5 parts of deodorized kerosene were mixed and dissolved in each other and the solution was charged in an aerosol container. After attaching a valve portion to the container, 85 parts of a propellant (e.g. Freon, vinyl chloride monomer or liquefied petroleum gas) was charged under pressure through said valve portion into the container to obtain an aerosol.

EXAMPLE 20

0.2 part of the compound 12 was dissolved in kerosene to make 100 parts, whereby an oil preparation was obtained.

EXAMPLE 21

1.5 g. of the compound 12 was dissolved in 20 ml. of acetone, and the solution was mixed with 98.5 g. of talc and was then freed from acetone by vaporization to obtain a dust preparation.

EXAMPLE 22

10 parts of the compound 12, 10 parts of Sorpol 2020 a kind of surface active agent, trade name of TOHO Chemical Co., Ltd., Japan: a mixture of polyoxyethylene alkyl phenyl ether and alkylaryl calcium sulfonate and 80 parts of xylene were mixed and dissolved with stirring to obtain an emulsifiable concentrate.

EXAMPLE 23

0.4 part of the compound 12, 0.5 part of Sumithion (a registered trademark), 5 parts of xylene and 9.1 parts of deodorized kerosene were mixed and dissolved, and the solution was charged in an aerosol container. After attaching a valve portion to the container, 85 parts of a propellant (e.g. Freon, vinyl chloride monomer or liquefied petroleum gas) was charged under pressure through said valve portion into the container to obtain an aerosol.

EXAMPLE 24

0.2 part of the compound 12 and 1 part of piperonyl butoxide were dissolved in kerosene to make 100 parts, whereby an oil preparation was obtained.

EXAMPLE 25

0.2 part of the compound 12 and 0.5 part of BHC were dissolved in 5 parts of xylene, and the solution was mixed with kerosene to make 100 parts, whereby an oil preparation was obtained.

EXAMPLE 26

0.5 part of the compound 12 and 1 part of sevine were thoroughly mixed with 98.5 parts of talc to obtain a dust preparation.

EXAMPLE 27

0.2 part of the compound 12, 0.2 part of allethrin, 2 parts of piperonyl butoxide, 5 parts of xylene and 7.6 parts of deodorized kerosene were mixed and dissolved, and the solution was charged in an aerosol container. After attaching a valve portion to the container, 85 parts of a propellant (e.g. Freon, vinyl chloride monomer or liquefied petroleum gas) was charged under pressure through said valve portion into the container to obtain an aerosol.

EXAMPLE 28

0.4 part of the compound 12, 2 parts of piperonyl butoxide and 11.6 parts of deodorized kerosene were mixed with 1 part of Atmos 300 (registered trade name of an emulsifier produced by Atlas Chemical Co.). The mixture was emulsified by addition of 50 parts of pure water, and was then charged into an aerosol container together with 35 parts of a 3:1 mixture of deodorized butane and deodorized propane, whereby a water-based aerosol was obtained.

EXAMPLE 29

0.4 part of the compound 13 and 2 parts of piperonyl butoxide were dissolved in 7 parts of xylene, and the solution was mixed with kerosene to make 100 parts, whereby an oil preparation was obtained.

EXAMPLE 30

0.2 part of the compound 17 was dissolved in 5 parts of xylene, and the solution was mixed with kerosene to make 100 parts, whereby an oil formulation was obtained.

EXAMPLE 31

0.5 g. of the compound 17 was dissolved in 20 ml. of methanol, and the solution was homogeneously mixed with 99.5 g. of a mosquito coil carrier (a 5:3:1 mixture of tabu powder, pyrethrum marc and wood powder). After vaporizing the methanol, the mixture was thoroughly kneaded with 150 ml. of water and was then shaped and dried to obtain a mosquito coil.

EXAMPLE 32

0.4 part of the compound 17, 2 parts of piperonyl butoxide, 2 parts of methoxychlor, 5 parts of xylene and 5.6 parts of deodorized kerosene were mixed and dissolved each other, and the solution was charged into an aerosol container. After attaching a valve portion to the container, 85 parts of a propellant (e.g. Freon, vinyl chloride monomer or liquefied petroleum gas) was charged under pressure through said valve portion into the container to obtain an aerosol.

EXAMPLE 33

0.2 part of the compound 17 and 0.5 part of Sumithion were dissolved in 5 parts of xylene, and the solution was mixed with kerosene to make 100 parts, whereby an oil preparation was obtained.

EXAMPLE 34

0.1 part of the compound 17 and 0.2 part of DDVP were dissolved in 3 parts of xylene, and the solution was mixed with kerosene to make 100 parts, whereby an oil preparation was obtained.

EXAMPLE 35

0.2 g. of the compound 17 was dissolved in a suitable amount of chloroform, and the solution was uniformly adsorbed on the surface of 0.3 cm. thick asbestos of 2.5 cm. x 1.5 cm., then removed the chloroform. Onto the thus treated asbestos, an asbestos sheet same in size as above was pasted, whereby fibrous fumigant insecticidal composition to be heated on an electrical hot plate was obtained.

EXAMPLE 36

0.25 g. of the compound 17 and 0.25 g. of allethrin were dissolved in 20 ml. of methanol, and the solution was homogeneously mixed with 99.5 g. of a mosquito coil carrier (a 5:3:1) mixture of tabu powder, pyrethrum marc and wood powder). After vaporizing the methanol, the mixture was thoroughly kneaded with 150 ml. of water and was then shaped and dried to obtain a mosquito coil.

EXAMPLE 37

0.5 g. of the compound 18 was dissolved in 20 ml. of methanol, and the solution was treated in the same manner as in Example 36 to obtain a mosquito coil.

EXAMPLE 38

0.9 part of the compound 19 and 0.5 part of natural pyrethrin extract (active ingredient: 20%) were dissolved in 5 parts of xylene, and the solution was mixed with kerosene to make 100 parts, whereby an oil preparation was obtained.

EXAMPLE 39

15 parts of the compound 21 and 5 parts of piperonyl butoxide were dissolved in 30 ml. of acetone. After mixing the solution with 93.5 parts of talc, the acetone was removed by vaporization to obtain a dust preparation.

EXAMPLE 40

0.7 g. of the compound 22 was dissolved in 20 ml. of methanol, and the solution was treated in the same manner as in Example 36 to obtain a mosquito coil.

EXAMPLE 41

0.2 part of the compound 23 and 1 part of piperonyl butoxide were dissolved in 5 parts of xylene, and the solution was mixed with kerosene to make 100 parts, whereby an oil preparation was obtained.

EXAMPLE 42

0.5 part of the compound 27 and 2.5 parts of piperonyl butoxide were dissolved in 7 parts of xylene, and the solution was mixed with kerosene to make 100 parts, whereby an oil preparation was obtained.

EXAMPLE 43

0.2 part of the compound 28 and 0.1 part of 3,4,5,6-tetrahydrophthalimidomethyl chrysanthemate (hereinafter referred to as "phthalthrin") are dissolved in 5 parts of xylene, and the solution was mixed with kerosene to make 100 parts, whereby an oil preparation was obtained.

EXAMPLE 44

1 g. of the compound 30 was dissolved in 20 ml. of methanol, and the solution was treated in the same manner as in Example 36 to obtain a mosquito coil.

EXAMPLE 45

0.4 part of the compound 37 was dissolved in kerosene to make 100 parts, whereby an oil preparation was obtained.

EXAMPLE 46

15 parts of the compound 37, 20 parts of Sorpol 2020 and 65 parts of xylene were mixed and dissolved with stirring to obtain an emulsifiable concentrate.

EXAMPLE 47

0.3 part of the compound 39 and 1.5 parts of piperonyl butoxide were dissolved in 7 parts of xylene, and the solution was mixed with kerosene to make 100 parts, whereby an oil preparation was obtained.

EXAMPLE 48

10 parts of the compound 40, 10 parts of Sorpol SM-200 (same as mentioned before) and 80 parts of xylene were mixed and dissolved with stirring to obtain an emulsifiable concentrate.

EXAMPLE 49

0.2 part of the compound 48 and 0.5 part of Sumithion were dissolved in 5 parts of xylene, and the solution was mixed with kerosene to make 100 parts, whereby an oil preparation was obtained.

EXAMPLE 50

0.5 part of the compound 51 and 2.5 parts of piperonyl butoxide were dissolved in kerosene to make 100 parts, whereby an oil preparation was obtained.

EXAMPLE 51

5 parts of the compound 52, 25 parts of piperonyl butoxide, 20 parts of Sorpol 2020 (same as mentioned before) and 50 parts of xylene were mixed and dissolved with stirring to obtain an emulsifiable concentrate.

EXAMPLE 52

0.5 part of the compound 55 was dissolved in 5 parts of xylene, and the solution was mixed with kerosene to make 100 parts, whereby an oil preparation was obtained.

EXAMPLE 53

3 parts of the compound 58 was dissolved in 30 ml. of acetone, and the solution was mixed with 97 parts of talc. The mixture was thoroughly stirred in a mortar, and then acetone was removed by vaporization to obtain a dust preparation.

EXAMPLE 54

0.4 part of the compound 59 and 0.5 part of Sumithion (a registered trade name) were dissolved in 5 parts of xylene, and the solution was mixed with kerosene to make 100 parts, whereby an oil preparation was obtained.

EXAMPLE 55

0.5 part of the compound 69 was dissolved in 5 parts of xylene, and the solution was mixed with kerosene to make 100 parts, whereby an oil preparation was obtained.

EXAMPLE 56

0.5 part of the compound 70 and 0.5 part of Sumithion were dissolved in 5 parts of xylene, and the solution was mixed with kerosene to make 100 parts, whereby an oil preparation was obtained.

EXAMPLE 57

5 parts of the compound 71, 5 parts of BHC, 10 parts of Sorpol 2020 (same as mentioned before) and 80 parts of xylene were mixed and dissolved with stirring to obtain an emulsifiable concentrate.

The insecticidal effects of several of the present compositions obtained in the above manners will be shown below with reference to test examples.

TEST EXAMPLE 1

About 20 housefly adults were released in a (70 cm.$^3$) glass chamber. Into the chamber, 0.7 ml. of each of the oil preparations obtained according to Examples 16, 20, 30, 38 and 43 was uniformly sprayed under a pressure of 20 pounds by means of a glass-made atomizer. Thereafter, the number of knocked down houseflies was observed with time to calculate the values of KT50 (50% knocked down time). The results are as shown in Table 1.

TABLE 1

| Insecticidal composition: | KT50 (sec.) |
|---|---|
| Oil preparation of Example 16 | 120 |
| Oil preparation of Example 20 | 45 |
| Oil preparation of Example 30 | 68 |
| Oil preparation of Example 38 | 62 |
| Oil preparation of Example 43 | 75 |
| 0.1% phthalthrin oil preparation | 96 |

TEST EXAMPLE 2

About 20 northern house mosquito adults were released in a (70 cm.$^3$) glass chamber. Into the chamber, 0.7 ml. of each of the oil preparation obtained according to Examples 10, 12, 14, 17, 41, 45 and 56 was sprayed and the values of KT50 (same as mentioned above) were calculated in the same manner as in Test Example 1 to obtain the results as shown in Table 2.

TABLE 2

| Insecticidal composition: | KT50 (sec.) |
|---|---|
| Oil preparation of Example 10 | 99 |
| Oil preparation of Example 12 | 110 |
| Oil preparation of Example 14 | 82 |
| Oil preparation of Example 17 | 275 |
| Oil preparation of Example 41 | 51 |
| Oil preparation of Example 45 | 67 |
| Oil preparation of Example 56 | 85 |
| 0.2% allethrin oil preparation | 140 |

TEST EXAMPLE 3

About 20 northern house mosquito adults were released in a (70 cm.$^3$) glass chamber. 1 g. of each of the mosquito coils obtained according to Examples 31, 36, 37, 40 and 44 was ignited on both ends and was placed at the center inside the chamber. Thereafter, the number of knocked down mosquito adults was observed with time to calculate the values of KT 50 (same as mentioned above). The results are as shown in Table 3.

TABLE 3

| Insecticidal composition: | KT 50 (min.) |
|---|---|
| Mosquito coil of Example 31 | 10 |
| Mosquito coil of Example 36 | 10.5 |
| Mosquito coil of Example 37 | 10.5 |
| Mosquito coil of Example 40 | 10.5 |
| Mosquito coil of Example 44 | 10.5 |
| 0.5% Allethrin mosquito coil | 12 |

TEST EXAMPLE 4

The insecticidal effects on housefly adults of the aerosols obtained according to Examples 19, 23, 27, 28 and 32 were tested by the aerosol test method using Peet Grady chamber. The results are as shown in Table 4.

TABLE 4

| Insecticidal composition | Sprayed amount (mg./(6 ft.)$^3$) | Knocked down ratio percent, in— 5 min. | 10 min. | 15 min. | Knock down mortality ratio, percent |
|---|---|---|---|---|---|
| Aerosol of Example: | | | | | |
| 19 | 670 | 8.5 | 36.6 | 73.1 | 59.8 |
| 23 | 650 | 19.8 | 62.0 | 87.5 | 77.5 |
| 27 | 650 | 17.4 | 53.6 | 70.4 | 53.1 |
| Water-based aerosol of Example 28 | 630 | 25.8 | 78.9 | 93.5 | 86.5 |
| Aerosol of Example 32 | 670 | 22.6 | 53.4 | 71.3 | 52.1 |
| OTA | 650 | 15.4 | 56.4 | 71.8 | 42.6 |

NOTE.—OTA is Official Test Aerosol of The Chemical Specialties Manufacturers Association in U.S.A.

TEST EXAMPLE 5

Into a 300 ml. beaker was charged 200 ml. of a liquid formed by diluting with water to 5000 times each of the emulsifiable concentrate obtained according to Examples 18, 22, 48, 51 and 57. In the beaker, about 30 full grown larvae of northern house mosquito were liberated and, on the next day, 100% of the larvae could be killed, in every case.

TEST EXAMPLE 6

Each of the oil preparation obtained according to Examples 25, 33, 34 and 49 was sprayed onto the surface of a plywood in a proportion of 50 ml./m.$^2$, and was then air-dried. On the plywood, a 10 cm. diameter glass ring coated on the inner surface with butter was placed. Into this ring, about 10 German cockroach adults were released. After continuous contact for 24 hours, the number of knocked down insects (including killed insects) was observed to obtain the results as shown in Table 5.

TABLE 5

| Insecticidal composition: | Ratio of knocked down insects (%) |
|---|---|
| Oil preparation of Example 25 | 70 |
| Oil preparation of Example 33 | 100 |
| Oil preparation of Example 34 | 100 |
| Oil preparation of Example 49 | 95 |

TEST EXAMPLE 7

In a 1/50,000 Wagner pot were grown rice plants which had elapsed 45 days after seeding. The rice plants were sprinkled by means of a bell jar duster with 300 mg./pot of each of the dust preparation obtained according to Example 21, 26 and 53. Subsequently, the rice plants were covered with a wire net. Into the wire net, 30 green rice leaf-hopper adults were released, and the number of knocked down insects was observed with time to calculate the values of KT 50 (same as mentioned above). Further, after 24 hours, the life and death of the insects were observed. The results are as shown in Table 6.

TABLE 6

| Insecticidal composition | KT 50 (min.) | Lethal ratio after 24 hours, percent |
|---|---|---|
| Dust preparation of Example: | | |
| 21 | 11 | 100 |
| 26 | 17 | 100 |
| 53 | 23 | 100 |
| 1.5% malathion dust preparation | 34 | 100 |

TEST EXAMPLE 8

In a 1/50,000 Wagner pot were grown rice plants which had elapsed 45 days. The rice plants were sprayed with 10 ml./pot of a liquid formed by diluting to a test concentration each of the emulsifiable concentrate obtained according to Example 22, 46 and 51. Subsequently, the values of KT 50 (same as mentioned above) of green rice leaf hopper adults and the lethal ratios thereof after 24 hours were calculated in the same manner as in Test Example 7 to obtain the results as shown in Table 7.

TABLE 7

| Insecticidal composition | Dilution times | KT 50 (min.) | Lethal ratio after 24 hours, percent |
|---|---|---|---|
| Emulsifiable concentrate of Example: | | | |
| 22 | × 200 | 9 | 98 |
| 46 | × 300 | 14 | 99 |
| 51 | × 200 | 15 | 100 |
| 50% malathion emulsifiable concentrate | × 1,000 | 32 | 100 |

TEST EXAMPLE 9

The present compounds were individually dissolved in kerosene to prepare oil preparation having given test concentrations.

5 ml. of each oil preparation was sprayed in 10 seconds by use of Campbell's turntable. After 20 seconds, the shutter was opened, and housefly adults (a group of about 100 insects) were exposed to the spray for 10 minutes. Thereafter, the houseflies were transferred to an observation cage. At that time, the number of knocked down insects was observed and, after one day, the life and death of the houseflies were observed to calculate the knocked down ratio and lethal ratio of the insects. The results were as shown below.

INSECTICIDAL EFFECTS OF THE PRESENT COMPOUNDS ON HOUSEFLY ADULTS

| Compound No. | Concentration of active ingredient Percent | Knocked down ratio after 10 minutes | Lethal ratio after one day |
|---|---|---|---|
| (1) | 0.4 | 100 | 53 |
| (2) | 0.2 | 100 | 45 |
| (3) | 0.4 | 100 | 75 |
| (4) | 0.5 | 100 | 58 |
| (5) | 0.4 | 100 | 80 |
| (6) | 0.2 | 100 | 56 |
| (7) | 0.4 | 100 | 45 |
| (8) | 0.2 | 100 | 43 |
| (9) | 0.2 | 100 | 87 |
| (10) | 0.2 | 100 | 55 |
| (11) | 0.2 | 100 | 49 |
| (12) | 0.2 | 100 | 90 |
| (13) | 0.4 | 100 | 64 |
| (14) | 0.4 | 100 | 55 |
| (15) | 0.5 | 100 | 88 |
| (16) | 0.5 | 100 | 38 |
| (17) | 0.2 | 100 | 90 |
| (18) | 0.2 | 100 | 76 |
| (19) | 0.2 | 100 | 70 |
| (20) | 0.5 | 100 | 92 |
| (21) | 0.5 | 100 | 90 |
| (22) | 0.4 | 100 | 58 |
| (23) | 0.4 | 100 | 90 |
| (24) | 0.5 | 100 | 20 |
| (25) | 0.5 | 100 | 25 |
| (26) | 1.0 | 100 | 70 |
| (27) | 1.0 | 100 | 80 |
| (28) | 0.2 | 100 | 55 |
| (29) | 1.0 | 100 | 23 |
| (30) | 0.5 | 100 | 58 |
| (31) | 0.5 | 100 | 50 |
| (32) | 0.5 | 100 | 78 |
| (33) | 0.5 | 100 | 62 |
| (34) | 0.5 | 100 | 70 |
| (35) | 0.5 | 100 | 67 |
| (36) | 0.5 | 100 | 97 |
| (37) | 0.2 | 100 | 80 |
| (38) | 0.5 | 100 | 55 |
| (39) | 0.2 | 100 | 63 |
| (40) | 0.5 | 100 | 47 |
| (41) | 0.5 | 100 | 50 |
| (42) | 1.0 | 100 | 15 |
| (43) | 0.4 | 100 | 68 |
| (44) | 0.2 | 100 | 73 |
| (45) | 0.2 | 100 | 65 |
| (46) | 0.2 | 100 | 70 |
| (47) | 1.0 | ca. 90 | 70 |
| (48) | 0.2 | 100 | 68 |
| (49) | 0.5 | 100 | 40 |
| (50) | 0.4 | 100 | 95 |
| (51) | 0.2 | 100 | 73 |
| (52) | 0.2 | 100 | 59 |
| (53) | 1.0 | ca. 90 | 68 |
| (54) | 1.0 | ca. 80 | 54 |
| (55) | 0.5 | 100 | 39 |
| (56) | 0.5 | 100 | 90 |
| (57) | 0.5 | 100 | 57 |
| (58) | 0.2 | 100 | 42 |
| (59) | 0.4 | 100 | 64 |
| (60) | 1.0 | 100 | 53 |
| (61) | 1.0 | 100 | 71 |
| (62) | 0.5 | 100 | 98 |
| (63) | 0.4 | 100 | 90 |
| (64) | 0.4 | 100 | 62 |
| (65) | 0.4 | 100 | 90 |
| (66) | 0.4 | 100 | 85 |
| (67) | 0.2 | 100 | 46 |
| (68) | 0.2 | 100 | 43 |
| (69) | 0.5 | 100 | 78 |

TABLE—Continued

| Compound No. | Concentration of active ingredient Percent | Knocked down ratio after 10 minutes | Lethal ratio after one day |
|---|---|---|---|
| (70) | 0.5 | 100 | 18 |
| (71) | 1.0 | 100 | 70 |
| Pyrethrin | 0.2 | 100 | 88 |
| Allethrin | 0.2 | 100 | 73 |
| Phthalthrin | 0.2 | 100 | 82 |

TEST EXAMPLE 10

The present compounds 12, 13, 22 and 23 and chrysanthemates corresponding thereto, i.e. phthalthrin, 1,2,3,6-tetrahydrophthalimidomethyl chrystanthemate, 1,2-dimethylsuccinimidomethyl chrysanthemate, and isopropylidenesuccinimidomethyl chrysanthemate, were individually formed into oil preparations. Using the same Campbell's turntable as in Test Example 9, each compound was tested in the same manner as in Test Example 9 to calculate the lethal ratio of houseflies at 3 test concentrations. Based on the results obtained, the insecticidal effects of the individual compounds were represented by the values of LC 50 (50% lethal concentration) to obtain the data as shown below.

INSECTICIDE EFFECTS ON HOUSEFLY ADULTS

| Compound | LC 50, percent | Effective ratio |
|---|---|---|
| Present compound (12) | 0.063 | 1.4 |
| Phthalthrin | 0.090 | 1.0 |
| Present compound (13) | 0.30 | >3.3 |
| 1,2,3,6-tetrahydrophthalimidemethyl chrysanthemate | >1.00 | 1.0 |
| Present compound (22) | 0.40 | 1.3 |
| 1,2-dimethylsuccinimidemethyl chrysanthemate | 0.50 | 1.0 |
| Present compound (23) | 0.24 | 1.5 |
| Isopropylidenesuccinimide methyl chrysanthemate | 0.37 | 1.0 |

TEST EXAMPLE 11

The present compounds 12, 17 and 22 and chrysanthemates corresponding thereto, i.e. phthalthrin dimethylmaleimidomethyl chrysanthemate and 1,2-dimethylsuccinimidomethyl chrysanthemate, were individually dissolved in deodorized kerosene to prepare oil formulations at test concentrations.

About 20 northern house mosquito adults were released in (70 cm.$^3$) glass chamber. Into the chamber, 0.7 ml. of each of the above-mentioned oil preparations was uniformly sprayed under a pressure of 20 pounds by means of a glass-made atomizer. Thereafter, the number of knocked down mosquitos was observed with time to obtain the results as shown below.

RATIO OF KNOCKED DOWN MOSQUITOS AT ELAPSED TIME, PERCENT

| | Seconds | | | | | | | | | KT 50 [1] (sec.) |
|---|---|---|---|---|---|---|---|---|---|---|
| | 38 | 53 | 75 | 105 | 150 | 210 | 300 | 420 | 600 | |
| Present compound (12), 0.1% | 23.6 | 44.9 | 56.3 | 69.6 | 82.8 | 89.8 | 96.9 | 99.0 | 99.0 | 65 |
| Phthalthrin, 0.1% | 20.2 | 34.6 | 48.1 | 61.5 | 78.8 | 89.6 | 95.8 | 97.9 | 100 | 76 |
| Present compound (17), 0.1% | 31.1 | 44.1 | 63.6 | 80.3 | 86.6 | 93.5 | 86.0 | 97.4 | 98.8 | 58 |
| Dimethylmaleimidomethyl chrysanthemate, 0.1% | 15.0 | 27.5 | 41.3 | 60.0 | 82.5 | 92.5 | 98.8 | 100 | 100 | 85 |
| Present compound (22), 0.1% | 20.0 | 37.5 | 50.0 | 70.0 | 82.5 | 90.0 | 95.0 | 97.5 | 100 | 72 |
| 1,2-dimethylsuccinimidomethyl chrysanthemate, 0.2% | 21.5 | 26.5 | 30.2 | 48.5 | 68.0 | 85.4 | 91.0 | 92.8 | 98.2 | 100 |

[1] KT 50=50% knocked down time.

What we claim is:
1. A compound of the formula,

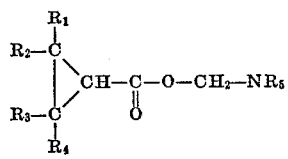

wherein $R_1$ is hydrogen, methyl or ethyl, each of $R_2$, $R_3$ and $R_4$ is independently methyl or ethyl, and $NR_5$ is selected from the group consisting of:

(a)
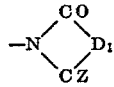

wherein
$D_1$ is a radical selected from the group consisting of phenyl, naphthyl, cyclohexyl, 3,4-dihydronaphthalene, 3,4-dihydro-7-methylnaphthalene, said phenyl being unsubstituted or substituted by methyl, chlorine or bromine, and Z is oxygen or sulfur;

(b)
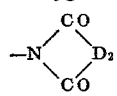

wherein $D_2$ is

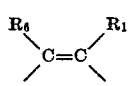

in which $R_6$ is a $C_1$-$C_3$ alkyl and $R_7$ is a $C_1$-$C_3$ alkyl, phenyl or benzyl;

(c)
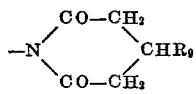

wherein $R_9$ is hydrogen or methyl;

(d)
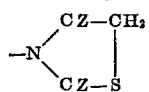

wherein Z is oxygen or sulfur;

(e)
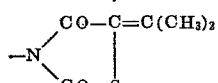

(f)
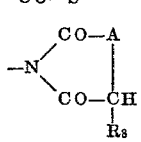

Wherein A is

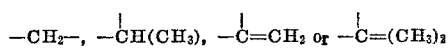

and $R_8$ is hydrogen or methyl;

(g)
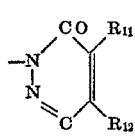

wherein $R_{10}$ is hydrogen or chlorine,
$R_{11}$ is hydrogen and
$R_{12}$ is methyl, or
$R_{11}$ and $R_{12}$ taken together with the adjacent unsaturated bond form a phenyl group;

(h)
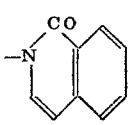

(i)
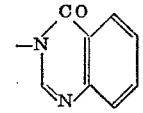

(j)
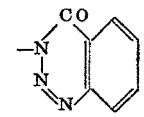

(k)
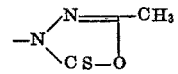

2. A compound of claim 1, wherein —$NR_5$ is (a) or (b).
3. A compound of claim 2, wherein —$NR_5$ is (a).
4. A compound of claim 2, wherein —$NR_5$ is (b).
5. A compound of claim 1, wherein —$NR_5$ is (c).
6. A compound of claim 1, wherein —$NR_5$ is (d).
7. A compound of claim 1, wherein —$NR_5$ is (e).
8. A compound of claim 1, wherein —$NR_5$ is (f).
9. A compound of claim 1, wherein —$NR_5$ is (g).
10. A compound of claim 2, wherein Z is oxygen.
11. A compound of claim 2, wherein —$NR_5$ is

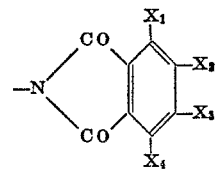

wherein each X is hydrogen, halogen or methyl.
12. A compound of claim 11, wherein $X_1$, $X_2$, $X_3$ and $X_4$ are hydrogen.
13. The compound of claim 12, wherein $R_1$, $R_2$, $R_3$ and $R_4$ are methyl.
14. A compound of claim 10, wherein —$NR_5$ is

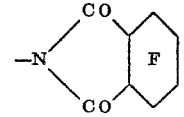

wherein the ring F is an aliphatic ring containing one or two unsaturated bonds.
15. The compound of claim 14, wherein $R_1$, $R_2$, $R_3$ and $R_4$ are methyl.
16. A compound of claim 1 of the formula:

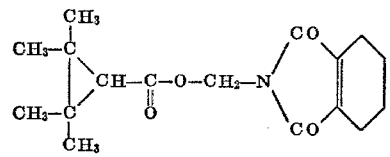

17. A compound of claim 1 of the formula:

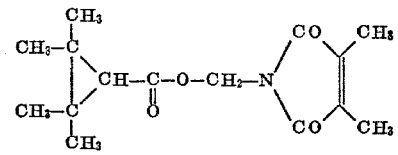

References Cited
UNITED STATES PATENTS 3,236,728 2/1966 Newallis et al. _____ 424—305
3,358,011 12/1967 Elliott _____ 260—468

ALEX MAZEL, Primary Examiner

J. TOVAR, Assistant Examiner